(12) United States Patent
Gunatilake

(10) Patent No.: US 8,438,484 B2
(45) Date of Patent: May 7, 2013

(54) VIDEO PREVIEW MODULE TO ENHANCE ONLINE VIDEO EXPERIENCE

(75) Inventor: Priyan Deveka Gunatilake, San Diego, CA (US)

(73) Assignee: Sony Corporation, Tokyo (JP)

( * ) Notice: Subject to any disclaimer, the term of this patent is extended or adjusted under 35 U.S.C. 154(b) by 210 days.

(21) Appl. No.: 12/844,119

(22) Filed: Jul. 27, 2010

(65) Prior Publication Data

US 2011/0113336 A1    May 12, 2011

Related U.S. Application Data

(60) Provisional application No. 61/258,749, filed on Nov. 6, 2009.

(51) Int. Cl.
*G06F 3/00*    (2006.01)

(52) U.S. Cl.
USPC ............. 715/720; 715/719; 715/721; 725/41; 725/88

(58) Field of Classification Search .................. 715/723, 715/721, 716
See application file for complete search history.

(56) References Cited

U.S. PATENT DOCUMENTS

| | | | | |
|---|---|---|---|---|
| 5,420,608 | A | * | 5/1995 | Choi et al. ..................... 345/563 |
| 5,550,965 | A | * | 8/1996 | Gabbe et al. .................. 715/209 |
| 5,884,056 | A | | 3/1999 | Steele |
| 5,956,026 | A | * | 9/1999 | Ratakonda ..................... 715/723 |
| 6,154,771 | A | * | 11/2000 | Rangan et al. ................ 709/217 |
| 6,166,735 | A | * | 12/2000 | Dom et al. ..................... 715/749 |
| 6,340,971 | B1 | | 1/2002 | Janse et al. |
| 6,647,535 | B1 | | 11/2003 | Bozdagi et al. |
| 6,961,908 | B2 | * | 11/2005 | Phillips ......................... 715/839 |
| 7,383,508 | B2 | * | 6/2008 | Toyama et al. ............... 715/723 |
| 7,401,351 | B2 | * | 7/2008 | Boreczky et al. .............. 725/88 |
| 2002/0059584 | A1 | * | 5/2002 | Ferman et al. .................. 725/34 |
| 2002/0175917 | A1 | | 11/2002 | Chakravarty et al. |
| 2003/0167472 | A1 | * | 9/2003 | Barbanson et al. ........... 725/131 |
| 2004/0128308 | A1 | * | 7/2004 | Obrador ....................... 707/102 |
| 2005/0175314 | A1 | * | 8/2005 | Hu .................................... 386/1 |
| 2005/0228849 | A1 | * | 10/2005 | Zhang .......................... 709/200 |
| 2009/0265737 | A1 | * | 10/2009 | Issa et al. ........................ 725/38 |
| 2010/0241962 | A1 | * | 9/2010 | Peterson et al. .............. 715/720 |

OTHER PUBLICATIONS

"Temporal segmentation of MPEG video sequences," in Visual Information and Information Systems. Third International Conference, Visual'99. Proceedings (Lecture Notes in Computer Science vol. 1614), by Ardizzone, E., Lodato, C., Lopes, S., 283-90xviii+827;xviii+827. Berlin, Germany:Springer-Verlag, 1999.*
"Scene abrupt change detection," In Canadian Conference on Electrical and Computer Engineering, by Wang, Xinying, Weng, Zhengke, 880-883. IEEE, Dec. 3, 2000.*
Java GUI Development: The Authoritative Solution, by Piroumian, Vartan. Sams Publishing, 1999.*

(Continued)

*Primary Examiner* — Tuyetlien Tran
*Assistant Examiner* — Patrick Ramsey
(74) *Attorney, Agent, or Firm* — John L. Rogitz

(57) ABSTRACT

A Video Preview Module, a fast and adaptable software module designed to generate an on-the-fly video storyboard that enhances the online video browsing experience of the user. The VP module is a client-side implementation. This allows the module to be scalable and adaptable in bringing a uniform online video browsing experience over multiple consumer devices.

16 Claims, 2 Drawing Sheets

OTHER PUBLICATIONS

J. S. Boreczky and L. A. Rowe. Comparison of Video Shot Boundary Detection Techniques. In Storage and Retrieval for Still Image and Video Databases IV, Proc. SPIE 2664, pp. 170-179, Jan. 1996.*

J.S. Boreczky and L.D. Wilcox, "A hidden Markov model framework for video segmentation using audio and image features," in Proc. Int. Conf. Acoustics, Speech, and Signal Processing (ICASSP-98), vol. 6, Seattle, WA, May 12-15, 1998, pp. 3741-3744.*

Fernando, W.A.C.; Canagararajah, C.N.; Bull, D.R.; "Fade-in and fade-out detection in video sequences using histograms ," Circuits and Systems, 2000. Proceedings. ISCAS 2000 Geneva. The 2000 IEEE International Symposium on , vol. 4, no., pp. 709-712 vol. 4, May 2000.*

Ciocca, Gianluigi; Schettini, Raimondo; "Dynamic storyboards for video content summarization," Proceedings of the 8th ACM international workshop on Multimedia information retrieval, pp. 259-268, Oct. 2006.*

Arnon Amir; Savitha Srinivasan; Dulce Ponceloen; Dragutin Petkovic; "CutVideo: Automated Video/audio indexing and browsing" http://portal.acm.org/citation.cfm?id=312759&dl=GUIDE&CFID=67914510&CFTOKEN=99163474, 1999.

\* cited by examiner

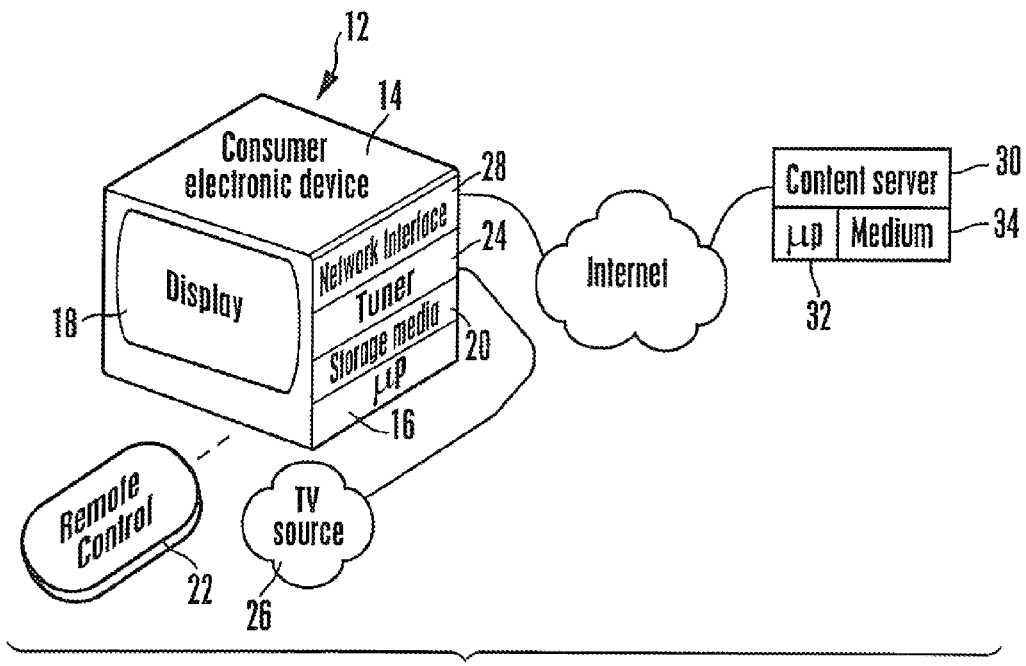
Figure 1
Figure 2 software architecture
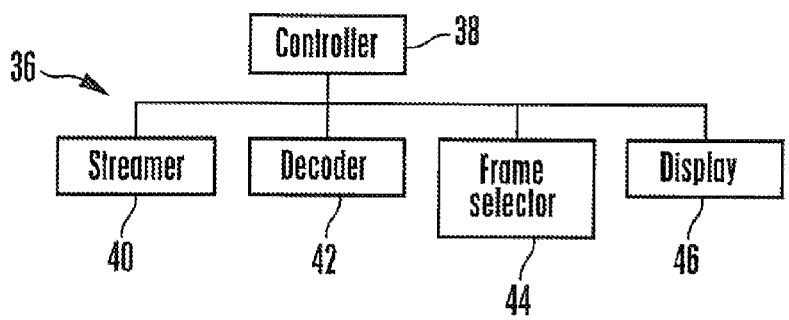
Figure 3
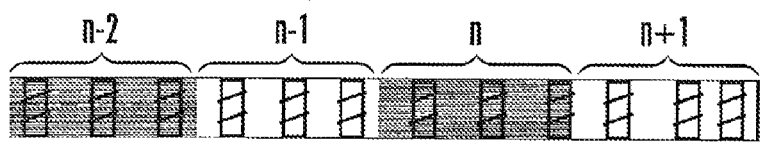
Four non-overlapping sections of the content (n-2 to n+1).
Three data chunks are obtained per section shown in hatch.

client side logic

VIDEO PREVIEW MODULE TO ENHANCE ONLINE VIDEO EXPERIENCE

This application claims priority to U.S. provisional patent application 61/258,749, filed Nov. 6, 2009.

I. FIELD OF THE INVENTION

The present application relates generally to video preview modules.

II. BACKGROUND OF THE INVENTION

People access online video through multiple devices. While the PC remains the most popular device of access, standalone Internet video devices, set top boxes, smart phones, and TV's have recorded gains recently. Regardless of the type of device, sifting through online video listings remains a tedious task. At present, a text based approach is predominantly used to describe video, where a selection is determined by its title and any optional information such as a thumbnail and meta-data containing descriptions and/or user comments.

Two improvements have been proposed, both of them server-centric. The first is the storyboard approach, in which a video storyboard presentation is added to a video link. A storyboard contains an array of frames that provide a useful guide to the content of the video. Typically, the movement of a mouse along a video link activates the accompanying storyboard. Unfortunately, current methods to generate storyboards are computationally intensive and therefore are typically pre-generated at the server, limiting its widespread use.

The second approach to enhance the online video experience is playback of "key" frames of the video. In this approach, a mouse action over the initial thumbnail representing the video initiates the playback of a subset of frames called key frames. Key frames are typically frames that can be decoded independently. The key frame generation is in real-time, so that the server need not pre-generate a key frame sequence apart from the stream itself.

As understood herein, both of the above-discussed server side enhancements impose restrictions in terms of availability, compatibility and performance. Availability is limited to only online video sites offering specific support for the functionality. For example, a client device may be able to access key-frame playback on one site but not on a site that does not support the feature. Compatibility is limited to those client devices that meet the minimum system requirements (memory, graphics, screen size etc.) needed to support the server's presentation format. As understood herein, devices such as smart phones may fall short in meeting these requirements. Finally, neither approach gives consideration to a client device's available bandwidth. This may result in unacceptable latencies in presentation.

SUMMARY OF THE INVENTION

Accordingly, a client-side apparatus includes a processor, a video display controlled by the processor, and a network interface by which the processor receives Internet video from a server over the Internet. A user input device communicates with the processor to send user selection signals to the processor. The processor executes a video preview module (VPM) to create an "on-the-fly" storyboard of the Internet video. The storyboard includes only a subset of frames in the video, and the processor presents the storyboard on the video display. The VPM includes a streamer block establishing one or more parallel connections to the server to obtain from the server the Internet video, and a decoder cooperating with the streamer block to stream in portions of video content from various locations of the Internet video. The decoder decodes frames from the Internet video. A frame selector operates on data from the streamer block to select a subset of frames from the stream for the storyboard for presentation of the storyboard on the display under control of a display block.

In example implementations the VPM further includes a controller block serving as overall manager of the VPM and executing initialization and run-time controls of all blocks, event handling, and responses. The controller block can receive a size and a resolution of the display and based thereon determine how many frames from the Internet video to use to establish the storyboard. Responsive to this the streamer block fetches "M" chunks of data for each of a sequence of non-overlapping sections of the Internet video. Each chunk of data can be established by an intraframe (I-frame) and the chunks of data can be equally spaced chunks from each other in a respective section of the Internet video, separated from each other by data in the Internet video.

In some embodiments the streamer block establishes multiple parallel streaming connections a link associated with the Internet video. The decoder may receive frames from the streamer block, decode the frames, and send the frames into a queue for processing by the frame selector.

Further, the frame selector may use a feature selection vector to establish an initial storyboard using only a subset of the "M" chunks of data fetched by the streamer block. In such an embodiment the initial storyboard is presented on the display and subsequently an expanded storyboard established by all of the "M" chunks of data fetched by the streamer block is presented on the display. The feature selection vector can be one or more of I-frame size and frame luminance histograms.

In another aspect, a consumer electronics (CE) device has a housing, a display on the housing, a network interface, and a processor controlling the display and communicating through the network interface. The processor executes logic that includes receiving one or more parameters associated with the display. Based on the one or more parameters associated with the display an integer number "M" of data chunks to be extracted from each of a sequence of sections of a video is determined. Responsive to a user selection of a video link presented on the display, the processor communicates with a server on a wide area network to receive from the server a video associated with the video link and extracts "M" data chunks from plural sections of the video received from the server on the wide area network. The processor decodes the data chunks, establishing a storyboard using only the "M" data chunks from each of the plural sections of the video received from the server on the wide area network, and then presents the storyboard on the display.

In another aspect, a Video Preview Module (VPM) is contained on a non-transitory computer readable storage medium and is executable by a client side processor to generate an on-the-fly video storyboard that enhances online video browsing experiences of users. The VPM is scalable and adaptable in bringing a uniform online video browsing experience over multiple consumer devices.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an example system in accordance with present principles;

FIG. 2 is a block diagram of an example architecture for a software-implemented video preview module (VPW), it being understood that the architecture alternatively may be implemented in hardware;

FIG. 3 is a schematic diagram showing four example overlapping sections of content in an audio-video stream, with the data chunks obtained by the VPW indicated by hatching;

DETAILED DESCRIPTION OF THE PREFERRED EMBODIMENT

Figure 4:
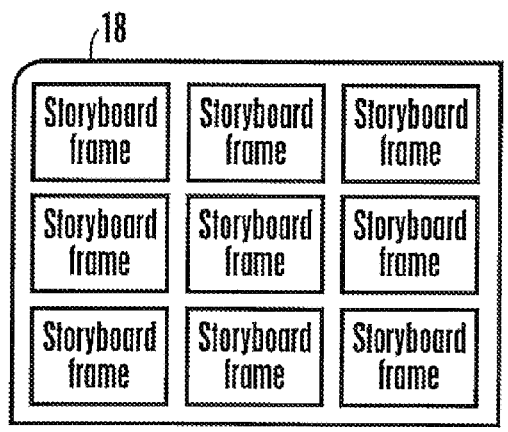
FIG. 4 is a screen shot showing a storyboard presentation in the grid mode.

Referring initially to FIG. 1, a consumer electronics (CE) device 12 such as a TV, game player, video disk player, camera, digital clock radio, mobile telephone, personal digital assistant, laptop computer, personal computer (PC), etc. includes a portable lightweight plastic housing 14 bearing a digital processor 16. The processor 16 can control a visual display 18 and an audible display such as one or more speakers. The processor 16 may access a media player module such that the CE device 12 has media decoding capability.

To undertake present principles, the processor 16 may access one or more computer readable storage media 20 such as but not limited to RAM-based storage, a chip implementing dynamic random access memory (DRAM)) or flash memory or disk storage. Software code implementing present logic executable by the CE device 12 may be stored on one of the memories shown to undertake present principles.

The processor 16 can receive user input signals from various input devices, including a wireless remote control (RC) 22, a point and click device such as a mouse, a keypad, etc. A TV tuner 24 may be provided in some implementations particularly when the CE device is embodied by a TV to receive TV signals from a TV broadcast signal source 26 such as a set-top box, satellite receiver, cable head end, terrestrial TV signal antenna, etc. The TV tuner 24 may be implemented in a set top box separately housed from the TV and communicating therewith. In other embodiments, no TV tuner may be provided. Signals from the tuner 24 are sent to the processor 16 for presentation on the display 18 and speakers.

As shown in FIG. 1, a network interface 28 such as a wired and/or wireless modem communicates with the processor 16 to provide connectivity to content servers 30 on the Internet (only one server 30 shown in FIG. 1 for clarity). The server 30 has a processor 32 and a tangible non-transitory computer readable storage medium 34 such as disk-based and/or solid state storage.

FIG. 2 shows an example architecture of a software-implemented Video Preview Module (VPM) 36 in accordance with present principles which executes the logic shown in FIG. 4 and described below. The VPM 36 is stored on the storage media 20 of the CE device 12 for execution by the CE device processor 16 and thus is a client-side algorithm. In overview, the VPM 36 is a fast algorithm to create an "on-the-fly" video storyboard of an online stream. Because, unlike the methods mentioned above, the VPM 36 executes on the client-device 12, the user of the device 12 experiences a uniform enhanced video browsing experience across all supported video content on the Internet.

As shown, the example VPM 36 is a sequential algorithm with a number of function-specific blocks that are managed by a central controller block 38. Given an online video link to access, a streamer block 40 makes one or more parallel connection to the server associated with the link. Under the control of a decoder 42 and the controller 38, the streamer block 40 streams in portions of video content from various locations of the video stream. The decoder 42 and a frame selector 44 operate on the data from the streamer block 40 to select a subset of frames from the stream, typically Motion Picture Experts Group (MPEG) intra-coded frames (I-frames) and referred to herein as candidate frames, for the video storyboard. A display block 46 then renders the selected frames as a video storyboard on the display 18.

The VPM 36 may use a number of open-source multimedia, graphics and AV-related libraries. The example software implementation enables the VPM to be portable across multiple client hardware platforms.

With greater specificity, the controller block 38 serves as the overall manager of the VPM 36 and is responsible for initialization and run-time controls of all blocks, event handling, and response of the module. The controller 38 functions to match the video storyboard creation to CE device 12 capability and network dynamics. At initialization, the controller 38 records the display 18 size and resolution. This is considered along with the target online video link's format and length to determine the number of frames to be included in the storyboard. A set of initial parameters corresponding to the determined number of frames in the storyboard are set in the streamer 40, decoder 42, frame selector 44, and display block 46. This capability leads to different storyboard presentation forms on different CE devices for the same online video link based on the device capability and if desired network throughput.

As an example, a CE device 12 embodied as a smart phone may present a more condensed video storyboard than a client device embodied TV for the same target video link. In one implementation, the number of candidate frames selected to compose the video storyboard varies inversely with greater network congestion (more congestion, fewer candidate frames) and directly with smaller display 18 size (smaller display, fewer candidate frames), and less display 18 resolution (less resolution, fewer frames, since low resolution devices would not benefit as much from an increased number of storyboard frames as higher resolution devices). In another implementation, the number of candidate frames selected to compose the video storyboard varies as above with network congestion and smaller display 18 size but may increase with less display 18 resolution, since less processing a needed to generate each lower-resolution candidate frame. Furthermore, the number of frames per video section determined by the VPM 36 for storyboard use may decrease as network bandwidth decreases and may increase or decrease depending on the video format of the target link. In any case, the precise number of candidate frames per device is heuristically determined as appropriate for the particular characteristics of that device and, if desired, network characteristics and target link video format.

Additionally, the controller 38 receives and processes all key events. By way of non-limiting example, cursor left, right, up, and down navigation keys, display mode toggle key, and play and pause controls are executed by the controller 38.

The streamer block 40, on the other hand, connects with the target link of an associated online video server 30 and streams portions of the content therefrom. The streaming operation is controlled by the controller 38 and decoder 42. Based on the CE device capabilities mentioned above and if desired the network throughput, the controller 38 determines the number of frames to be contained in the storyboard. This number is passed to the streamer 40 at, e.g., device 12 initialization. When a target video stream link from a server 30 is subsequently selected by a user of the CE device 12, the streamer 40 accesses the target online video stream from the server 30 and divides the target online video stream into non-overlapping sections as shown in FIG. 3.

The streamer 40 fetches "M" equally spaced chunks of data per each section (in the example shown in FIG. 3, M=3). Shown in cross-hatch in FIG. 3 is an illustration of the data chunks obtained per section by the streamer 40. In one example, each chunk is established by a single respective I-frame and the I-frame (or in some embodiments, frames) of a chunk constitute the candidate frames for the video storyboard. While the data sections are continuous to each other, the individual chunks shown in cross-hatch are not continuous to each other as shown, so that additional frames of the video content exist between successive chunks in the stream.

The streamer 40 can support hypertext transfer protocol (HTTP) and file-based access to the target online video link. Also, the streamer 40 may support user datagram protocol (UDP) and real time transport protocol (RTP). Additionally, the use of multiple parallel streaming connections to the video link to fetch data is an area targeted can be implemented, i.e., the streamer 40 may instantiate two connections simultaneously with the same video link so as to simultaneously access two identical versions of the same stream albeit in different portions of the stream (as by executing an automatic fast forward through one stream), as a way to more quickly obtain a temporal sequence of candidate frames for the storyboard.

The decoder 42 may, in some implementations, use an open-source software library that support popular online video formats such as MPEG-2, MPEG-4, H.264 (also referred to as advanced video coding), and Windows Media Video (WMV) compression formats. In addition to audio and video decoding of candidate storyboard frames, the decoder 42 instructs the streamer 40 to fetch chunks of data selected along the video stream as shown in FIG. 3.

As mentioned above, only I-frames within the "M" data chunks (in hatched in FIG. 3) which form "M" subsets of each non-overlapping section of content may be used in the storyboard. Accordingly, in such an implementation the decoder 42 receives the I-frames from the streamer 40, decodes them, and pushes the decoded I-frames into a queue for processing by the frame selector block 44. Audio segments corresponding to the decoded I-frames may also be decoded if desired, but in some implementations audio information need not be used.

To achieve a subjective summary of the selected video content that enables the user to piece together the content story, all of the I-frames of the stream may be used so that none of the "key events" in the stream are missed, but as mentioned above, such comprehensive storyboarding is not suited for a real-time implementation particularly on a resource limited client device. Hence, the VPM 36 may sacrifice some "subjective quality" for low-latency (speed) in the initial generation of the storyboard and then compensate any initial loss of the "subjective quality" by providing a fast visual seek and playback function to the user.

In one specific implementation of the above tradeoff, the frame selector 44 in the example VPM 36 uses I-frame size as the feature vector during initial frame selection. Recall that a total of "M" (e.g., three) I-frames per each section of content are considered in an example embodiment. The I-frame of the largest size is selected to represent the section of content. The chunks used initially to constitute the storyboard may be further winnowed by selecting the largest I-frame of a section content only when it exceeds a predetermined size threshold.

In another embodiment, instead of using I-frame size as a selection vector, a frame luminance histogram may be used, with the I-frame having the histogram with the most levels being selected.

In any case, the I-frames determined by the selection vector are used to establish an initial storyboard. After a predetermined time, e.g., a few seconds, or a predetermined event, e.g., a mouse action or trick play command or other event, additional I-frames are added to the storyboard incrementally or, if desired, all at once, i.e., the remaining I-frames from each group of "M" are added to the storyboard at once upon the elapse of the period or occurrence of the event.

Figure 5:
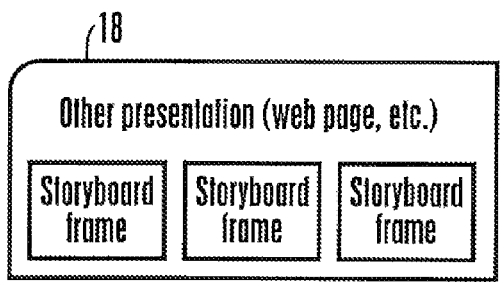
FIG. 5 is a screen shot showing a storyboard presentation in the linear mode.

The VPM 36 in one embodiment supports both grid and linear display modes. The grid display can be set as the default and a user may elect to change to linear if desired. FIG. 4 shows the grid display mode, in which the I-frames of the storyboard are arranged in a grid of rows and columns of I-frames with the temporal sequence of the frames progressing from left to tight in each row and from top to bottom among the rows. In FIG. 4, the storyboard encompasses substantially the entire display 18. In contrast, as shown in FIG. 5 in the linear mode a line of I-frames progresses from left to right across only a portion of the display with the remainder of the display presenting, e.g., the web page from which the video is selected.

Figure 6:
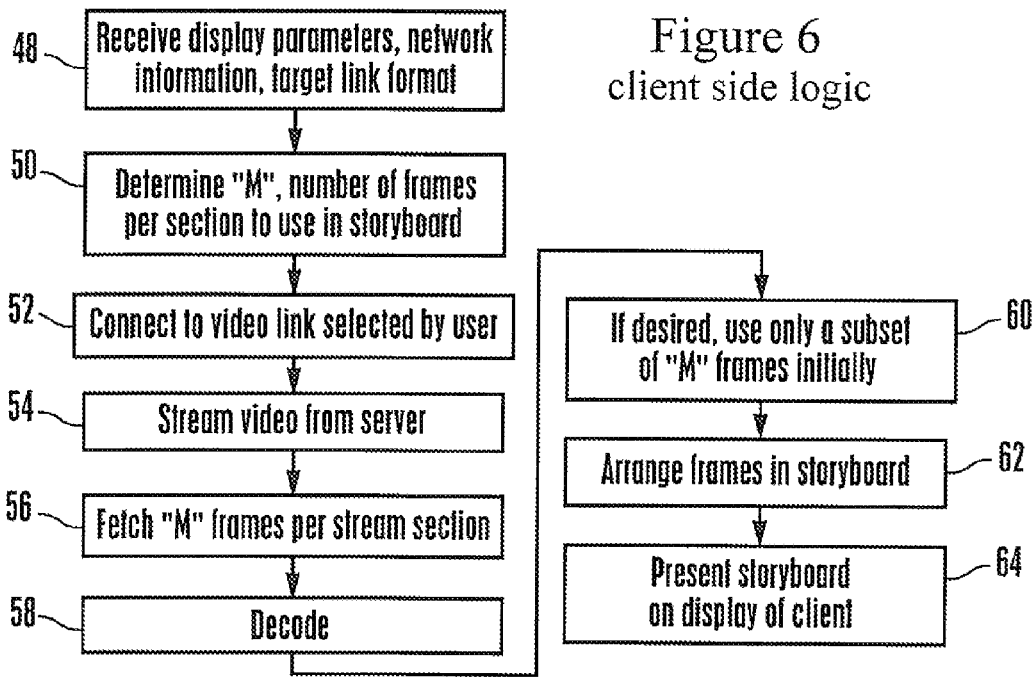
FIG. 6 is a flow chart of example logic.

Now referring to FIG. 6, at block 48 the processor 16 executing the VPM 36 receives the above-described display 18 parameters and if desired network information and target link video format, and based thereon determines "M" at block 50 in accordance with disclosure above. Responsive to a user selection of a video link presented on the display 18, at block 52 the processor connects to the server 30 associated with the link and streams or otherwise receives the video from the server at block 54.

Moving to block 56, the processor 16 executing the VPM 36 fetches or otherwise extracts "M" frames from each section of video as described above and decodes them at block 58. Proceeding to block 60, as discussed previously the initial storyboard may consist only of a subset of the "M" frames and that subset is arranged into a video storyboard such as shown in FIG. 4 or 5 at block 62. The storyboard is presented on the client display 18 at block 64. As also discussed above, after the initial presentation, more of the "M" frames can be added to the storyboard.

In example non-limiting implementations given for illustration only, the CE device 12 can be Linux Desktop and the processor 16 may be a three gigaHertz Dual-Core processor with one gigabyte of memory and supplied by Intel Corp. In another implementation the CE device 12 can be a high definition TV (HDTV) such as a HDTV provided by Sony Corp. or an HDTV based on the apparatus provided by Intel Corp. under the trade names of "Canmore" with a type x86 core and ninety six megabytes of memory and running versions of Linux 2.6.1× operating system kernels.

It will be appreciated that while the VPM may remain unchanged device to device, the graphics layer may change depending on the display 18 being used. As an example, a CE device 12 embodied as a desktop computer may use a graphics layer known as "Simple DirectMedia Layer", a cross-platform multimedia abstraction layer, as its application framework using SDL functions for graphics, event handling and operating system services (threads, mutexes, timers etc.). An HDTV-based CE device 12 may use the graphics layer known as "DirectFB", a cross-platform graphical abstraction layer, for its graphics operations. Event handling and OS services were handled using SDL similar to the Desktop Linux system.

In addition to the above, the VPM 36 may provide visual seek and playback in which a user can select, by means of the above-described input devices, to begin playback of the full video stream starting from any frame on the storyboard. This is equivalent to a visual seek. Furthermore, the user may be permitted to tag and comment any frame within the storyboard and share its link (the network address of the full video plus the position of the selected frame within the video) with other users, again by means of appropriately operating the input device of the CE device 12. This enables another user to jump directly into the tagged frame within the video stream and is an attractive feature in a social network environment. Furthermore, if desired video editing capability may be provided in which sections of the video as defined by the frames on the storyboard can be cropped, mixed and saved.

Still further, as noted above multiple simultaneous streaming connections to the online link may be used to speed up the streaming module. The vectors for selection of frames may be in the compressed video domain so that frame selection may be effected without the need for video decoding.

While the particular VIDEO PREVIEW MODULE TO ENHANCE ONLINE VIDEO EXPERIENCE is herein shown and described in detail, it is to be understood that the subject matter which is encompassed by the present invention is limited only by the claims.

What is claimed is:

1. Client-side apparatus comprising:
   processor;
   video display controlled by the processor;
   network interface by which the processor receives Internet video from a server over the Internet;
   user input device communicating with the processor to send user selection signals to the processor;
   the processor executing a video preview module (VPM) to create an "on-the-fly" storyboard of the Internet video, the storyboard including only a subset of frames in the video, the processor presenting the storyboard on the video display;
   wherein the VPM receives at least a resolution of the display and the number of frames in the subset composing the storyboard varies inversely with the resolution of the display, further the VPM uses a feature selection vector to establish an initial storyboard, and the feature selection vector is a frame luminance histogram.

2. The apparatus of claim 1, wherein the VPM further includes a controller block serving as overall manager of the VPM and executing initialization and run-time controls of all blocks, event handling, and responses.

3. The apparatus of claim 1, wherein the VPM fetches "M" chunks of data for each of a sequence of non-overlapping sections of the Internet video.

4. The apparatus of claim 3, wherein each chunk of data is established by an intraframe (I-frame).

5. The apparatus of claim 3, wherein the chunks of data are equally spaced chunks from each other in a respective section of the Internet video and are separated from each other by data in the Internet video.

6. The apparatus of claim 1, wherein the VPM establishes multiple parallel streaming connections to a link associated with the Internet video.

7. The apparatus of claim 4, wherein the VPM uses a feature selection vector to establish an initial storyboard using only a subset of the "M" chunks of data.

8. The apparatus of claim 7, wherein the initial storyboard is presented on the display and subsequently an expanded storyboard established by all of the "M" chunks of data fetched by the VPM is presented on the display.

9. The apparatus of claim 7, wherein a frame characterized by a histogram with a first number of levels is selected for the storyboard over a frame characterized by a histogram having a second number of levels based on the first number of levels being more than the second number of levels.

10. The apparatus of claim 1, wherein the VPM includes:
    a streamer block establishing one or more parallel connections to the server to obtain from the server the Internet video;
    a decoder cooperating with the streamer block to stream in portions of video content from various locations of the Internet video, the decoder decoding frames from the Internet video;
    a frame selector operating on data from the streamer block to select a subset of frames from the stream for the storyboard for presentation of the storyboard on the display under control of a display block.

11. Consumer electronics (CE) device comprising:
    housing;
    display on the housing;
    network interface;
    processor controlling the display and communicating through the network interface;
    the processor executing logic including:
        receiving one or more parameters associated with the display;
        based on the one or more parameters associated with the display determining an integer number "M" of data chunks to be extracted from each of a sequence of sections of a video;
        responsive to a user selection of a video link presented on the display, communicating with a server on a wide area network to receive from the server a video associated with the video link;
        extracting "M" data chunks from at least plural sections of the video received from the server on the wide area network, wherein an I-frame is extracted from a sequence of I-frames to establish at least a portion of a data chunk based on a determination that the I-frame meets or exceeds a threshold size;
        decoding the data chunks;
        establishing a storyboard using only the "M" data chunks from each of the plural sections of the video received from the server on the wide area network; and
        presenting the storyboard on the display wherein "M" varies with the format of the video.

12. The CE device of claim 11, wherein the processor prior to establishing a storyboard using only the "M" data chunks from each of the plural sections of the video received from the server on the wide area network establishes an initial storyboard using only of a subset of the "M" data chunks and presents the initial storyboard on the display.

13. The CE device of claim 12, wherein the processor uses a feature selection vector to establish the initial storyboard.

14. The CE device of claim 13, wherein the initial storyboard is presented on the display and subsequently an expanded storyboard established by all of the "M" data chunks is presented on the display.

15. The CE device of claim 13, wherein the feature selection vector is one or more of I-frame size, a frame luminance histogram.

16. The VPM of claim 11, wherein the processor varies a number of I-frames with a resolution of the display.

* * * * *